US012786696B2

(12) United States Patent
Lu et al.

(10) Patent No.: US 12,786,696 B2
(45) Date of Patent: Nov. 3, 2026

(54) TRANSMISSION METHOD, TERMINAL DEVICE, NETWORK DEVICE, AND COMMUNICATION SYSTEM

(71) Applicant: GUANGDONG OPPO MOBILE TELECOMMUNICATIONS CORP., LTD., Dongguan (CN)

(72) Inventors: Qianxi Lu, Dongguan (CN); Bingxue Leng, Dongguan (CN); Boyuan Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 446 days.

(21) Appl. No.: 18/380,455

(22) Filed: Oct. 16, 2023

(65) Prior Publication Data

US 2024/0040369 A1 Feb. 1, 2024

Related U.S. Application Data

(63) Continuation of application No. PCT/CN2021/092519, filed on May 8, 2021.

(51) Int. Cl.
*H04W 8/24* (2009.01)
*H04W 88/04* (2009.01)
*H04W 92/18* (2009.01)

(52) U.S. Cl.
CPC .............. *H04W 8/24* (2013.01); *H04W 88/04* (2013.01); *H04W 92/18* (2013.01)

(58) Field of Classification Search
CPC ... H04B 7/15; H04B 7/15507; H04L 41/5058; H04L 67/5086; H04L 67/51; H04L 67/75; H04M 3/44; H04W 8/005; H04W 8/24; H04W 8/26; H04W 16/26; H04W 40/24; H04W 48/16; H04W 76/11; H04W 76/14; H04W 76/23; H04W 84/047; H04W 88/04; H04W 92/18; H04W 8/0005
See application file for complete search history.

(56) References Cited

U.S. PATENT DOCUMENTS 10,469,154 B2 11/2019 Lee
10,841,789 B2 11/2020 Tang
(Continued)

FOREIGN PATENT DOCUMENTS

CN 106454806 A 2/2017
CN 108617024 A 10/2018
(Continued)

OTHER PUBLICATIONS

Huawei et al., "Adaptation layer functionalities for L2 U2N relay", 3GPP TSG-RAN WG2 Meeting #113bis electronic R2-2103494 Online, Apr. 12-20, 2021, section 2. 5 pages.
International Search Report in the international application No. PCT/CN2021/092519, mailed on Dec. 20, 2021. 5 pages with English translation.
Written Opinion of the International Search Authority in the international application No. PCT/CN2021/092519, mailed on Dec. 20, 2021. 10 pages with English translation.
(Continued)

*Primary Examiner* — Thomas R Cairns
(74) *Attorney, Agent, or Firm* — BAYES PLLC

(57) ABSTRACT

Provided are a transmission method, a terminal device and a network device. In the transmission method, a relay terminal as a terminal device receives a first message from a first remote terminal and transmits the first message to a network device; and the relay terminal determines a first user identity of the first remote terminal corresponding to the first message.

20 Claims, 25 Drawing Sheets

(56) References Cited

U.S. PATENT DOCUMENTS

| | | | |
|---|---|---|---|
| 2018/0287689 A1 | 10/2018 | Lee | |
| 2019/0166486 A1 | 5/2019 | Tang | |
| 2019/0239284 A1 | 8/2019 | Xu | |
| 2019/0261450 A1 | 8/2019 | Hiroyuki | |
| 2020/0022194 A1 | 1/2020 | Wang | |
| 2020/0100088 A1* | 3/2020 | Kim | H04W 48/16 |
| 2020/0213858 A1 | 7/2020 | Yi | |
| 2021/0006967 A1 | 1/2021 | Tang | |
| 2023/0073469 A1 | 3/2023 | Wang et al. | |

FOREIGN PATENT DOCUMENTS

| | | |
|---|---|---|
| CN | 110169102 A | 8/2019 |
| CN | 110326359 A | 10/2019 |
| CN | 111901847 A | 11/2020 |
| WO | 2017206186 A1 | 12/2017 |
| WO | 2018058683 A1 | 4/2018 |

OTHER PUBLICATIONS

International Search Report in the international application No. PCT/CN2021/088527, mailed on Jan. 10, 2022. 5 pages with English translation.

Written Opinion of the International Search Authority in the international application No. PCT/CN2021/088527, mailed on Jan. 10, 2022. 8 pages with English translation.

Ericsson (Moderator) et al., "New WID on NR Sidelink Relay", 3GPP TSG RAN Meeting #91e RP-210904 Electronic Meeting, Mar. 16-26, 2021, the whole document. 5 pages.

First Office Action of the European application No. 21937428.7, issued on Apr. 17, 2025, 5 pages.

Supplementary European Search Report in the European application No. 21937428.7, mailed on Jul. 29, 2024. 10 pages.

* cited by examiner

TRANSMISSION METHOD, TERMINAL DEVICE, NETWORK DEVICE, AND COMMUNICATION SYSTEM

CROSS-REFERENCE TO RELATED APPLICATIONS

This application is a continuation of International Patent application No. PCT/CN2021/092519 filed on May 8, 2021, which claims the benefit of priority to International Application No. PCT/CN2021/088527 filed on Apr. 20, 2021. The disclosures of these applications are hereby incorporated by reference in their entireties.

BACKGROUND

Device-to-device (D2D) communication is a sidelink (SL) transmission technology based on D2D, which is different from a conventional cellular system in which communication data is received or transmitted through a base station. Internet of vehicles adopts a manner of direct D2D communication, so it has higher spectrum efficiency and lower transmission delay.

In Rel-13 ProSe (proximity service), a UE-to-network relay function based on layer 3 relay is introduced, that is, remote UE accesses the network through relay UE. The relay UE undertakes a relay function of IP layer and transmits data between the remote UE and the network, and the remote UE and the relay UE are connected through a sidelink. In Rel-15 FeD2D (further enhancement D2D), the 3$^{rd}$ Generation Partnership Project (3GPP) studies a UE-to-network relay function based on layer 2 relay, that is, the remote UE accesses the network through the relay UE, where the relay UE undertakes a relay function of adaptation layer (which is above RLC layer and below PDCP layer) and transmits data between the remote UE and the network, and the remote UE and the relay UE are connected through the sidelink. In 3GPP Rel-17 sidelink relay, although a framework and logic of adaptation layer are provided for the UE-to-network relay function of layer 2 relay, there is no technical solution on how to make the relay UE obtain a user identity of the remote UE required by the adaptation layer.

Therefore, in 3GPP Rel-17 sidelink relay, how to make the relay UE obtain the user identity of the remote UE required by the adaptation layer is an urgent technical problem to be solved.

SUMMARY

The present disclosure relates to the communication field, in particular to a transmission method, a terminal device, a network device and a communication system.

In embodiments of the present disclosure, there is provided a transmission method, a terminal device, a network device and a communication system.

The embodiments of the present disclosure provide a transmission method, which includes the following operations. A relay terminal as a terminal device receives a first message from a first remote terminal and transmits the first message to a network device; and a first user identity of the first remote terminal corresponding to the first message is determined by the relay terminal.

The embodiments of the present disclosure further provide a terminal device, as a relay terminal, which includes a transceiver and a processor. The transceiver is configured to receive a first message from a first remote terminal and transmit the first message to a network device; and the processor is configured to determine a first user identity of the first remote terminal corresponding to the first message.

The embodiments of the present disclosure further provide a network device, which includes a transceiver. The transceiver is configured to receive a first message from a relay terminal as a terminal device, the first message being transmitted to the relay terminal by a first remote terminal. A first user identity of the first remote terminal corresponding to the first message is determined by the relay terminal.

The embodiments of the present disclosure can solve the above technical problem of enabling the relay terminal to obtain the user identify of the remote terminal required by the adaptation layer, and thus the 3GPP sidelink relay communication can be better supported.

DETAILED DESCRIPTION

Figure 1A:
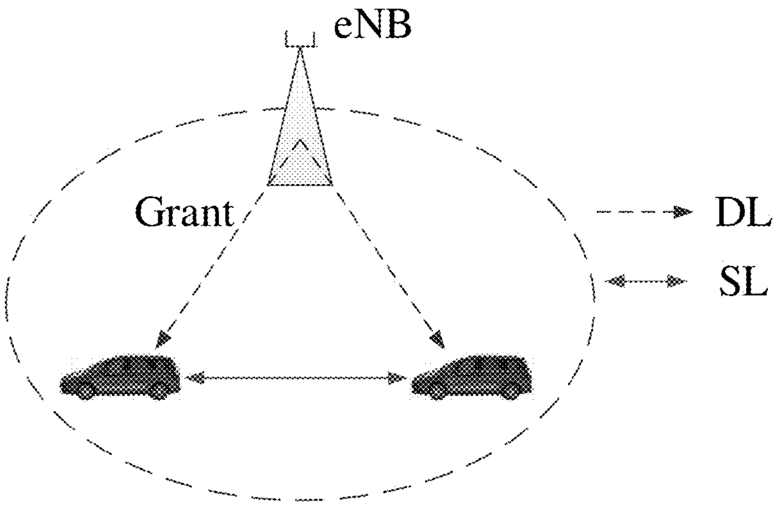
FIG. 1A exemplarily illustrates a transmission mode A of a sidelink transmission technology.

The technical solutions in the embodiment of the present disclosure will be described below with reference to the accompanying drawings in the embodiments of the present disclosure.

It should be noted that the terms such as "first", "second" in the description and claims of embodiments in the present disclosure and the above drawings are used to distinguish similar objects, and are not used to describe a particular order or priority. The objects described in the "first" and "second" at the same time may be the same or different.

The technical solution of the embodiments of the present disclosure may be applied to various communication systems. For example, a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (WiFi), a next generation communication system or other communication systems.

Generally speaking, conventional communication systems support a limited number of connections and are easy to implement. However, with the development of communication technology, mobile communication systems will not only support conventional communication, but also support, for example, device to device (D2D) communication, machine to machine (M2M) communication, machine type communication (MTC), vehicle to vehicle (V2V) communication, etc. Embodiments of the present disclosure may also be applied to these communication systems.

Optionally, the communication system in the embodiments of the present disclosure may be applied to a carrier aggregation (CA) scenario, a dual connectivity (DC) scenario, and a standalone (SA) network distribution scenario.

Embodiments of the present disclosure do not limit the spectra applied. For example, embodiments of the present disclosure may be applied to licensed spectrum or unlicensed spectrum.

Embodiments of the present disclosure are described in connection with a network device and a terminal device. The terminal device may be referred to as user equipment (UE), an access terminal, a subscriber unit, a subscriber station, a mobile station, a mobile platform, a remote station, a remote terminal, a mobile device, a user terminal, a terminal, a wireless communication device, a user agent, or a user device. The terminal device may be a station (ST) in the WLAN, it may be a cellular phone, a cordless phone, a session initiation protocol (SIP) telephone, a wireless local loop (WLL) station, a personal digital assistant (PDA) device, a handheld device with wireless communication function, a computing device or other processing device connected to wireless modem, an in-vehicle device, a wearable device, a next-generation communication system such as a terminal device in an NR network, or the terminal device in the future evolved public land mobile network (PLMN) network, etc.

By way of example and not limitation, in the embodiments of the present disclosure, the terminal device may also be a wearable device. The wearable device may also be called wearable intelligent device, which is the general name of wearable devices developed by applying wearable technology to intelligently design daily wear, such as glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. Generalized wearable smart devices have full functions and large size, which may realize complete or partial functions without relying on smart phones, such as smart watches or smart glasses, and only focus on certain application functions, and the wearable smart devices need to be used in conjunction with other devices such as smart phones, such as various smart bracelets and smart jewelry for monitoring physical signs.

The network device may be a device for communicating with a mobile device, the network device may be an access point (AP) in WLAN, a base transceiver station (BTS) in GSM or CDMA, a base station (NodeB, NB) in WCDMA, an evolutional node B (eNB or eNodeB) in LTE, a relay station or an access point, or an in-vehicle device, a wearable device, a network device in NR network (gNB) or a network device in future evolved PLMN network, etc.

In the embodiments of the present disclosure, the network device provides services for a cell, the terminal device communicates with the network device through transmission resources (e.g. frequency domain resources, or spectrum resources) used by the cell, the cell may be a cell corresponding to a network device (e.g. a base station), and the cell may belong to a macro base station or a base station corresponding to a small cell. The small cell may include metro cell, micro cell, pico cell, femto cell, etc. These small cells have the characteristics of small coverage and low transmission power, and are suitable for providing high-speed data transmission services.

It should be understood that the terms "system" and "network" of the present disclosure are often used interchangeably herein. In the present disclosure, the term "and/or" is used to describe an association relationship of associated objects, and represents that there may be three relationships. For example, A and/or B may represent the following three situations: i.e., independent existence of A, existence of both A and B and independent existence of B. In addition, the character "I" in the present disclosure generally represents that an "or" relationship is formed between the previous and next associated objects.

It should be understood that the "indicate" mentioned in the embodiments of the present disclosure may be a direct indication, may be an indirect indication, or may indicate an association relationship. For example, A indicates B, which may mean that A directly indicates B, for example, B may be obtained through A. It can also mean that A indirectly indicates B, for example, A indicates C, and B may be obtained by C. It can also indicate that there is an association relationship between A and B.

In the description of embodiments of the present disclosure, the term "correspond" may mean that there is a direct correspondence or an indirect correspondence relationship between the two, or may also mean that there is an association relationship between the two, or may also be a relationship between indication and being indicated, configuration and being configured, etc.

In order to facilitate understanding of the technical solution of the embodiments of the present disclosure, the following related technologies of the embodiments of the present disclosure are described, and the following related technologies may be arbitrarily combined with the technical solution of the embodiments of the present disclosure as an optional solution, all of which belong to the protection scope of the embodiments of the present disclosure.

Device-to-device (D2D) communication is an SL transmission technology based on D2D, which is different from a conventional cellular system in which communication data is received or transmitted through a base station. Internet of vehicles system adopts a manner of direct D2D communication, so it has higher spectrum efficiency and lower transmission delay. 3GPP defines two transmission modes are defined: Mode A and Mode B.

Figure 1B:
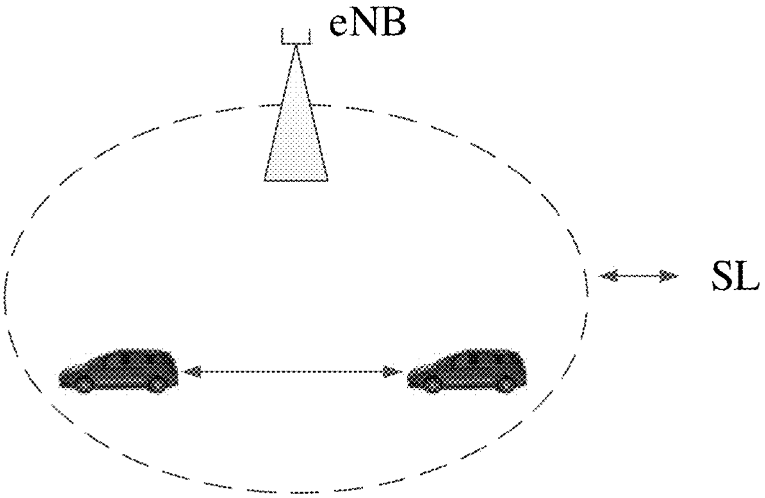
FIG. 1B exemplarily illustrates a transmission mode B of a sidelink transmission technology.

FIG. 1A exemplarily illustrates a transmission mode A of a sidelink transmission technology. In the Mode A, transmission resources for a terminal are allocated by a base station, and the terminal transmits data on a sidelink according to the resources allocated by the base station. The base station may allocate resources of single transmission for the terminal, and may also allocate resources of semi-static transmission for the terminal. FIG. 1B exemplarily illustrates a transmission mode B of a sidelink transmission technology. In the Mode B, a vehicle terminal selects resources from a resource pool to transmit data.

In Rel-13 ProSe, a UE-to-network relay function based on layer 3 relay is introduced, that is, remote UE accesses the network through relay UE. The relay UE undertakes a relay function of IP layer and transmits data between the remote UE and the network, and the remote UE and the relay UE are connected through a sidelink. In Rel-15 FeD2D, 3rd Generation Partnership Project (3GPP) studies a UE-to-network relay function based on layer 2 relay, that is, the remote UE accesses the network through the relay UE. The relay UE undertakes a relay function of adaptation layer (which is above RLC layer and below PDCP layer) and transmits data between the remote UE and the network, and the remote UE and the relay UE are connected through the sidelink.

In 3GPP Rel-17 sidelink relay, the framework and logic of adaptation layer are provided for the UE-to-network relay function of layer 2 relay.

Specifically, according to the configuration from the gNB, the UE may participate in broadcasting and monitoring a discovery message through the Uu interface (the interface between the terminal and the access network in the 5G system is still referred to as the Uu interface for short, also called the air interface) in the idle state and the Radio Resource Control (RRC) connected state. UE may broadcast and monitor the discovery messages under half duplex constraint.

The UE participating in broadcasting and monitoring the discovery message may maintain the current Universal Time Coordinated (UTC) time. The UE participating in broadcasting transmits a discovery message, which may be generated by Proximity based Service (Prose) protocol while taking into account the UTC time when transmitting the discovery message. For the UE participating in monitoring, the Prose protocol provides a message that is validated together with the received UTC time provided by the Prose Function (i.e., Prose function entity).

In order to perform synchronization, the UE participating in broadcasting the discovery message may act as a synchronization source by transmitting the Sidelink Broadcast Control Channel (SBCCH) and the synchronization signal based on resource information of the synchronization signal provided in the System Information Block (SIB) 19.

Maximum transmission powers allowed for each range level is given in SIB19. The UE uses the applicable maximum allowable transmission power corresponding to its granted scope level. This sets an upper limit for the transmission power determined based on open-loop power control parameters.

Figure 2:
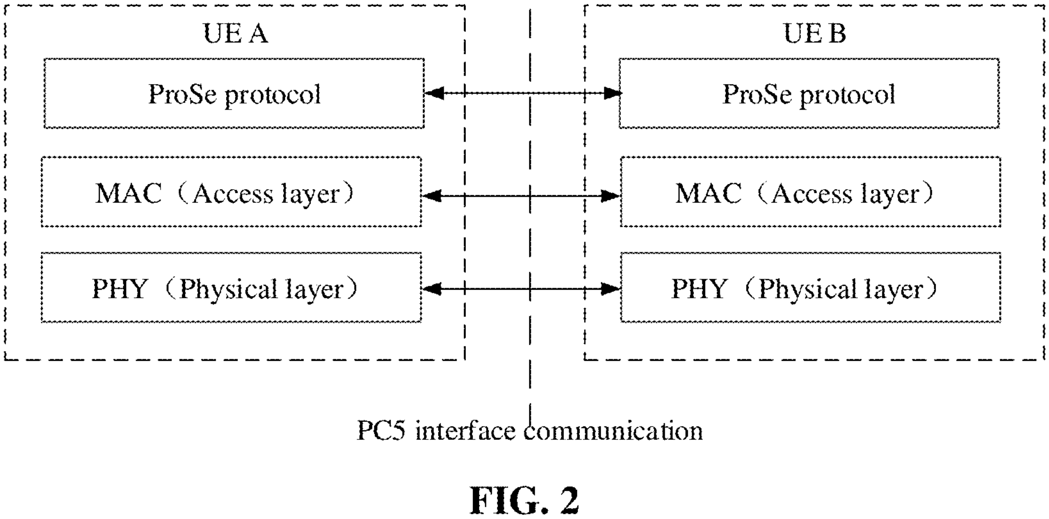
FIG. 2 exemplarily illustrates a communication between two terminals UE A and UE B via a PC5 interface.

When there are multiple relays, the remote terminal may perform radio link measurements at the PC5 interface (referring to for example, FIG. 2) and use the results of the measurements and criteria defined by a high layer such as RLC layer and above (which is simply referred to as "high layer criteria", for example, link quality and/or supported Qos based on the access layer may be used as high level criteria) to select and re-select the relay from Prose UE to network. If the PC5 link quality exceeds a configured threshold (which may be pre-configured or provided by the eNB), the corresponding relay terminal may be considered suitable to be selected as a relay terminal by a remote terminal. The remote terminal selects a terminal that satisfies the high level criterion and has the best or better PC5 link quality simultaneously as the final selected relay terminal from all terminals suitable to be relay terminals.

For a layer 2 (L2) relay from terminal to network, the adaptation layer is placed over RLC sublayer(s) in the control plane and the user plane at the Uu interface between the relay UE and the gNB. Uu Service Data Adaptation Protocol (SDAP)/Packet Data Convergence Protocol (PDCP) and RRC terminate between the remote terminal and the gNB, while RLC, MAC and PHY terminate in each link (i.e. terminate on a link between the remote terminal and the relay terminal and on a link between the relay terminal and the gNB, respectively).

In addition, whether the adaptation layer is also supported at the PC5 interface between the remote UE and the relay UE will be studied in the WI phase.

However, there is no technical solution for how to enable the relay UE to obtain the user identity of the remote UE required by the adaptation layer.

Therefore, in 3GPP Rel-17 sidelink relay, how to make the relay UE obtain the user identity of the remote UE required by the adaptation layer is an urgent technical problem to be solved.

Figure 4:
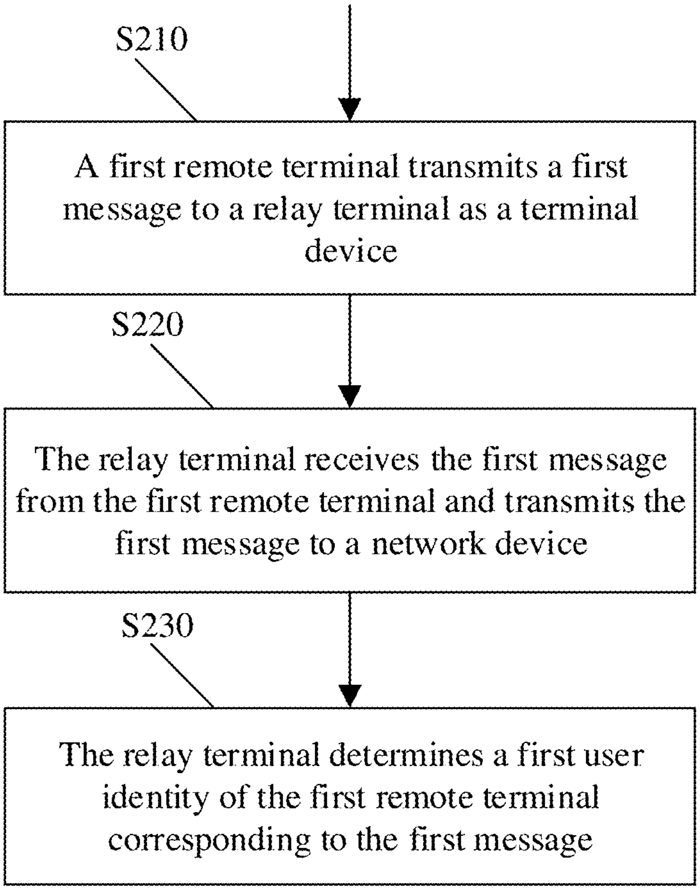
FIG. 4 exemplarily illustrates a schematic flowchart of a transmission method according to an embodiment of the present disclosure.

Embodiments of the present disclosure provide a transmission method, and FIG. 4 exemplarily illustrates a schematic flowchart of a transmission method according to an embodiment of the present disclosure. The method may optionally be applied to remote terminals, relay terminals, and/or a network device in a sidelink relay system, but it is not limited thereto. The method includes at least some of the following operations.

At S210, a first remote terminal transmits the first message to a terminal device as a relay terminal.

Optionally, the first message may be an RRC signaling.

Optionally, the first message may include messages such as RRCSetupRequest, RRCResumeRequest, RRCResumeRequestl, RRCReconfigurationComplete.

It should be noted that the first message of the present disclosure are not limited to the messages listed above.

Optionally, when transmitting the first message to the relay terminal, the first remote terminal may not carry an adaptation layer header in the first message, or may carry the adaptation layer header in the first message but the carried adaptation layer header may be filled with a default value.

At S220, the relay terminal receives the first message from the first remote terminal and transmits the first message to the network device.

Optionally, when transmitting the first message to the network device, the relay terminal may not carry an adaptation layer header in the first message, or may carry the adaptation layer header in the first message but the carried adaptation layer header may be filled with a default value.

At S230, the relay terminal determines a first user identity of the first remote terminal corresponding to the first message.

In this way, the technical problem of enabling the relay terminal to obtain the user identify of the remote terminal required by the adaptation layer can be solved, and thus the 3GPP sidelink relay communication can be better supported.

Optionally, the operation that the relay terminal determines the first user identity of the first remote terminal corresponding to the first message in S230 may include at least one of the following:

- the relay terminal allocates the first user identity to the first remote terminal; and
- the relay terminal receives the first user identity from the network device.

That is, in the present disclosure, the user identity of the remote terminal required by the adaptation layer may be obtained by allocating the user identity by the relay terminal to the remote terminal. Alternatively, the user identity of the remote terminal required by the adaptation layer may be obtained by receiving the user identity by the relay terminal from the network device, that is, the user identity of the remote terminal required by the adaptation layer is obtained by allocating a respective user identify by the network device to the remote terminal.

Alternatively, the user identity of the remote terminal required by the adaptation layer may also be obtained by allocating the respective user identity by the remote terminal itself.

Figure 5:
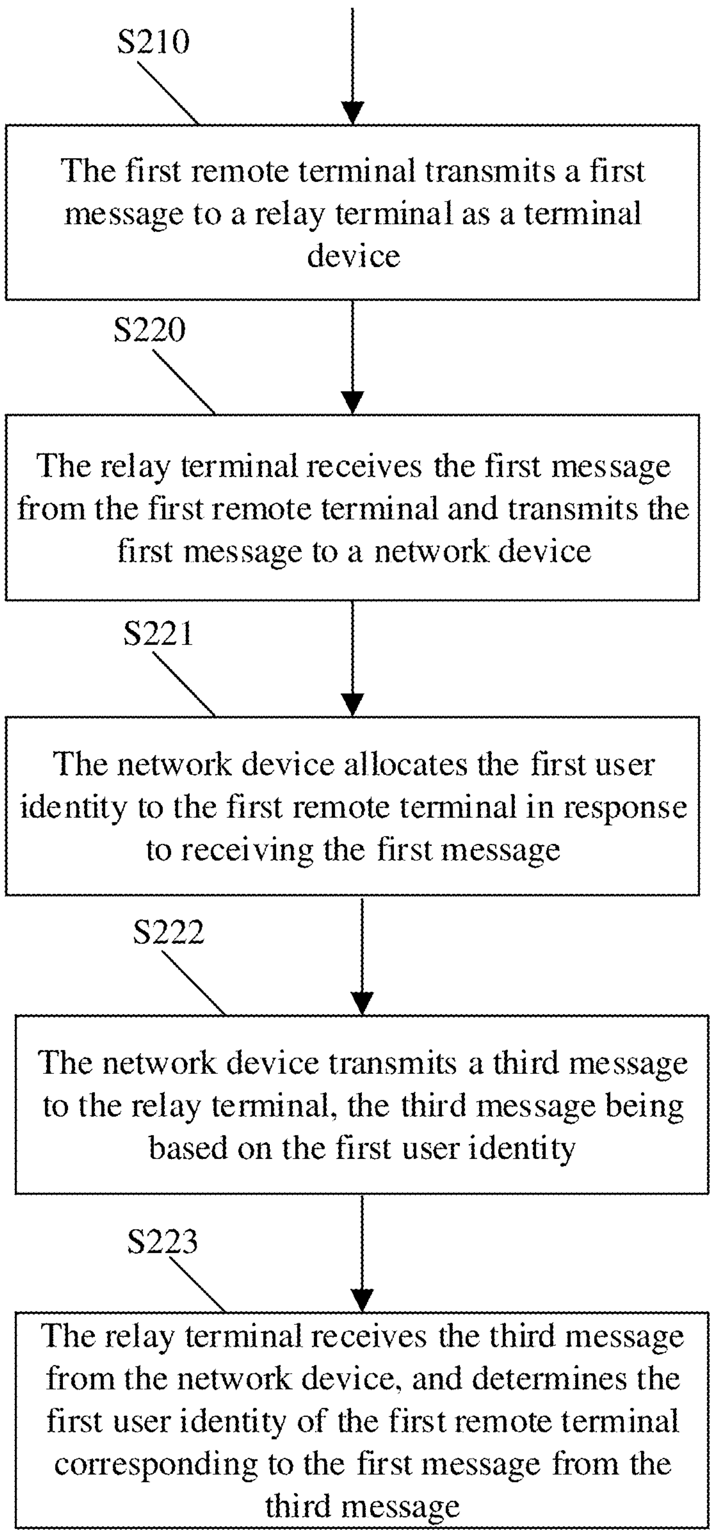
FIG. 5 exemplarily illustrates a schematic flowchart of a transmission method according to another embodiment of the present disclosure.

Optionally, as illustrated in FIG. 5, the above transmission method may also include the following operation.

At S221, the network device allocates a first user identity to the first remote terminal in response to receiving the first message.

By allocating the user identity to the remote terminal by the network device (for example, by a processor of the network device), centralized control by the network can be realized, and a problem that user identities of remote terminals duplicate within the management range of the network device can be avoided.

Optionally, the above transmission method may also include the following operation.

At S222, the network device transmits a third message to the relay terminal, the third message being based on the first user identity.

In this operation, the network device (e.g. its processor) may generate, based on the first user identity, a third message as a response message for the first message, and then transmit the generated third message to the relay terminal.

Optionally, as illustrated in FIG. 5, the above transmission method may also include the following operation.

At S223, the relay terminal receives the third message from the network device, and determines, based on the received third message, the first user identity of the first remote terminal corresponding to the first message and allocated by the network device.

At this time, the operation S223 may correspond to the operation S230 in FIG. 4 to some extent, i.e., the relay terminal determines the first user identity of the first remote terminal corresponding to the first message. That is, S223 may be an example of an implementation of S230.

Figure 6:
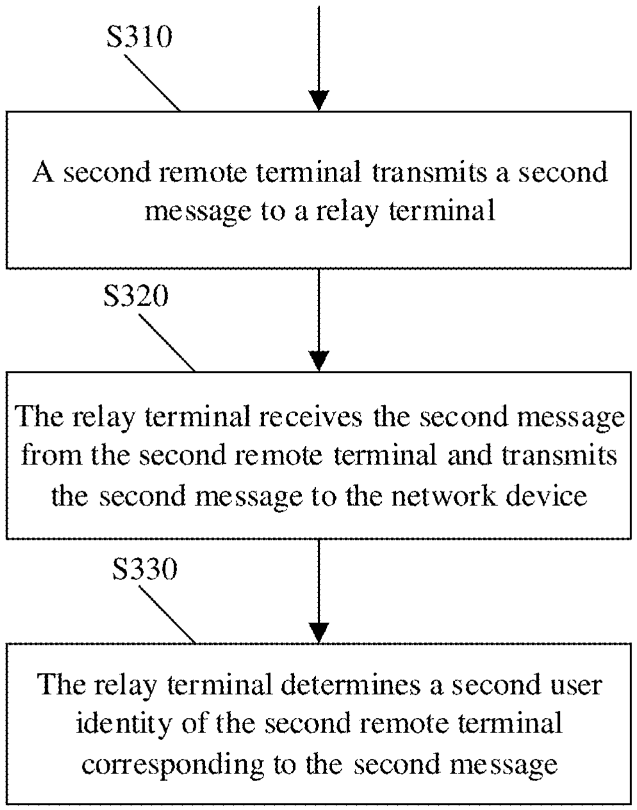
FIG. 6 exemplarily illustrates a schematic flowchart of a transmission method according to another embodiment of the present disclosure.

Optionally, as illustrated in FIG. 6, the above transmission method may also include the following operations.

At S310, a second remote terminal transmits a second message to a relay terminal as a terminal device.

Optionally, the second message is similar to the first message and will not be repeated here.

Optionally, when transmitting the second message to the relay terminal, the second remote terminal may not carry an adaptation layer header in the second message, or may carry the adaptation layer header in the second message when transmitting but the carried adaptation layer header may be filled with a default value.

At S320, the relay terminal receives the second message from the second remote terminal and transmits the received second message to the network device.

Optionally, when transmitting the second message to the network device, the relay terminal may not carry an adaptation layer header in the second message, or may carry the adaptation layer header in the second message when transmitting but the carried adaptation layer header may be filled with a default value.

At S330, the relay terminal determines a second user identity of the second remote terminal corresponding to the second message.

In fact, the flowchart illustrated in FIG. 6 is similar to the flowchart illustrated in FIG. 4, both of which belong to a case where different remote terminals interact with the relay terminal.

Optionally, the operation that the relay terminal determines the second user identity of the second remote terminal corresponding to the second message in S330 may include at least one of the following:

- the relay terminal allocates the second user identity of the second remote terminal to the second remote terminal; and
- the relay terminal receives the second user identity of the second remote terminal from the network device.

The operation in S330 is similar to the case of S220.

It may be burst for different remote terminals to transmit messages to the relay terminal. However, in the present disclosure, since the first message and the second message may not carry any ID or similar identify information, in a case where the relay terminal forwards the received messages similar to the first message and second message directly to the network device, as for identify information used to identify the corresponding terminal that is returned by the network device for such messages, it will be difficult for the relay terminal to accurately identify which terminal or terminals the identify information is used for.

Thus, optionally, after transmitting the first message to the network device, the relay terminal may wait for a response message for the first message (as the third message described above) from the network device (S222), until the response message from the network device is received by the relay terminal (S223). The response message will indicate the first user identity of the first remote terminal corresponding to the first message.

Optionally, the relay terminal may transmit the received message from another remote terminal, such as a second message, to the network device while waiting for the response message for the first message. In this case, the response message for the first message (i.e., the third message) from the network device may be received before or after the relay terminal transmits the second message.

Optionally, the operation S230 in the above-described transmission method may include at least one of the following:

- the relay terminal forwards the third message received from the network device to the first remote terminal; or
- the relay terminal transmits a fourth message to the first remote terminal, the fourth message being based on the first user identity of the first remote terminal parsed out from the third message.

Optionally, the above transmission method may also include the following operation.

At S240, the first remote terminal receives from the relay terminal the third message forwarded by the relay terminal.

Optionally, the above transmission method may also include the following operation.

At S240', the first remote terminal receives the fourth message from the relay terminal, the fourth message being based on the first user identity of the first remote terminal parsed out from the third message.

Optionally, the above transmission method may include at least one of the following:

- the first remote terminal obtains the first user identify through a signaling from a network; and
- the second remote terminal obtains the second user identify through a signaling from the network.

Optionally, the above transmission method may include at least one of the following:

- the first remote terminal obtains the first user identity through at least one of the received third message or the fourth message.

Optionally, the above transmission method may include at least one of the following:

- the second remote terminal obtains a second user identity through a response message for the second message received from the relay terminal.

Optionally, the first remote terminal obtains the first user identity from an adaptation layer header associated with at least one of the received third message or the fourth message, and/or the second remote terminal obtains the second user identity from an adaptation layer header associated with the received response message for the second message.

Figure 3:
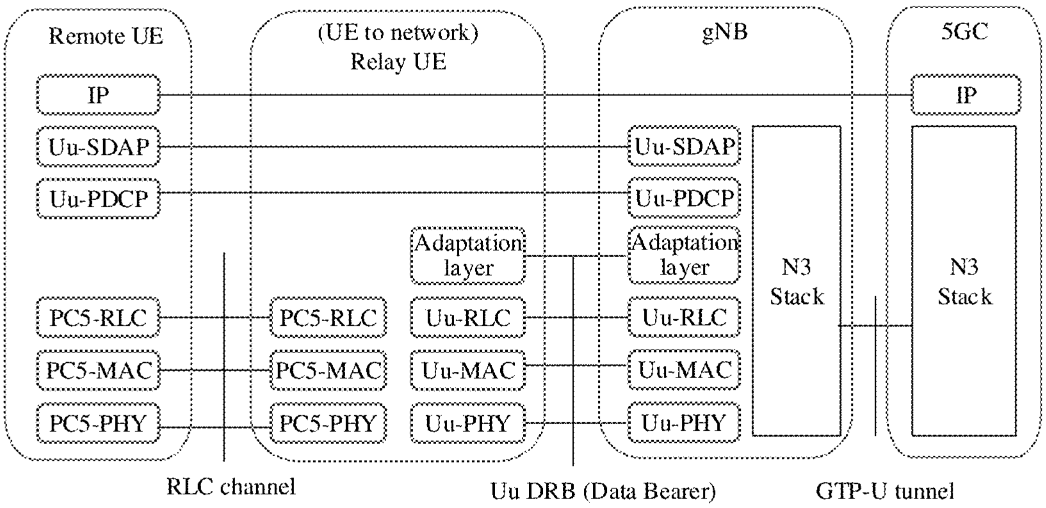
FIG. 3 exemplarily illustrates a communication from a remote terminal to a network via a relay terminal.

As illustrated in FIG. 3, there is an adaptation layer that is located on each of the relay terminal and the network device, and there may be no adaptation layer on the remote terminal. The above user identity of the remote terminal is used for the adaptation layer, and therefore the remote terminal may obtain its corresponding user identity or not.

In addition, optionally, a length of the user identity of the remote terminal may be smaller than a length of the identity (ID) of the remote terminal, such that communication and processing resources can be saved and the transmission efficiency is improved.

Figure 7:
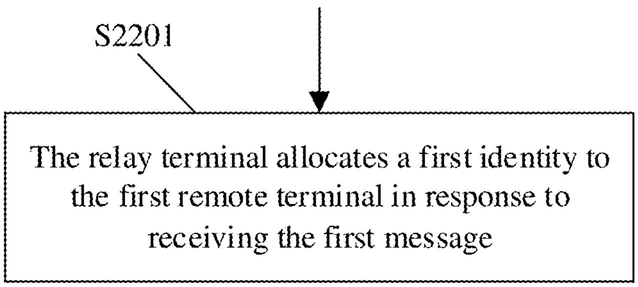
FIG. 7 exemplarily illustrates a schematic flowchart of a transmission method according to another embodiment of the present disclosure.

Optionally, as illustrated in FIG. 7, the above transmission method may also include the following operation.

At S2201, in response to receiving the first message, the relay terminal allocates a first identity to the first remote terminal.

When the relay terminal transmits the first message to the network device (S220), the first message carries the first identify.

Figure 8:
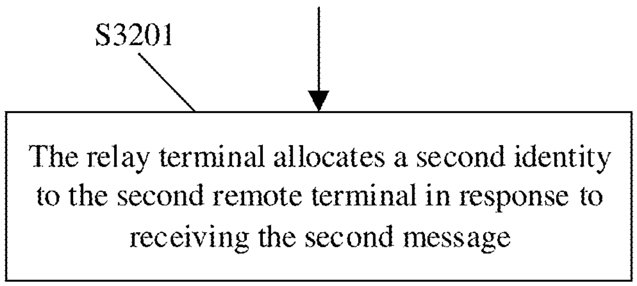
FIG. 8 exemplarily illustrates a schematic flowchart of a transmission method according to another embodiment of the present disclosure.
Figure 9:
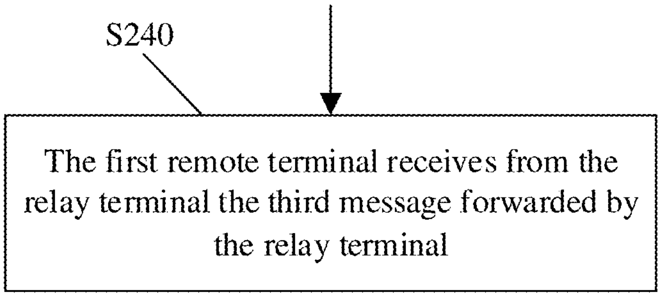
FIG. 9 exemplarily illustrates a schematic flowchart of a transmission method according to another embodiment of the present disclosure.
Figure 10:
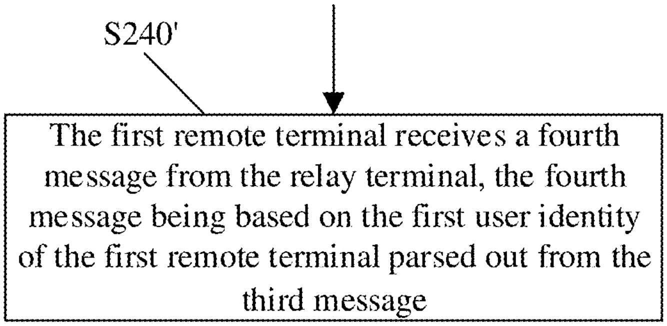
FIG. 10 exemplarily illustrates a schematic flowchart of a transmission method according to another embodiment of the present disclosure.

Optionally, as illustrated in FIG. 8, the above transmission method may also include the following operation.

At S3201, in response to receiving the second message, the relay terminal allocates a second identity to the second remote terminal.

Thus, when the relay terminal transmits the second message to the network device (i.e., S320), the second message carries the second identify in.

In the embodiments of the present disclosure, since the relay terminal may allocate identify information of corresponding remote terminals, and the identify information may be carried in corresponding messages, it is unnecessary to wait for arrival of the response message for the first message before executing other actions. Instead, the second message may be transmitted after transmission of a corresponding message, such as a first message, and before reception of a response message from the network device.

Optionally, in the embodiments of the present disclosure, the relay terminal receives a response message for responding to at least one of the first message or the second message from the network device.

Optionally, the response message may indicate at least one of that the relay terminal uses a first identity as the first user identity of the first remote terminal, or that the relay terminal uses a second identity as a second user identity of the second remote terminal.

That is, in the embodiments of the present disclosure, the identities of corresponding remote terminals allocated by the relay terminal may be directly used as their user identities.

Optionally, the response message indicates at least one of that the relay terminal replaces a first identity with the first user identity, or that the relay terminal replaces a second identity with a second user identity.

That is, in the embodiments of the present disclosure, it is not the identities of the corresponding remote terminals allocated by the relay terminal but the user identities allocated by the network device are used as their identities.

Optionally, at least one of the first identity of the first remote terminal or the second identity of the second remote terminal is not used by other remote terminals.

Optionally, a length of the first identity is less than a length of an ID of the first remote terminal corresponding to the first identity, and/or a length of the second identity is less than a length of an ID of the second remote terminal corresponding to the second identity. In this way, the length of the first identity and the length of the second identity occupy less resource, thereby achieving favorable effects of saving resources and improving processing efficiency.

Optionally, a length of the first identity of the first remote terminal is the same as or different from a length of the first user identity of the first remote terminal; and/or a length of the second identify of the second remote terminal is the same as or different from a length of the second user identify of the second remote terminal.

Optionally, at least one of the first identity of the first remote terminal or the second identity of the second remote terminal is transmitted in an adaptation layer header or in control signaling.

Optionally, the relay terminal receives a third message as the response message from the network device, the third message being based on the first user identity of the first remote terminal.

Subsequent operations of the embodiment are similar to the corresponding operations described previously and will not be repeated here.

Optionally, according to an embodiment of the present disclosure, the first message may carry identity (ID) information of the first remote terminal.

That is, when the terminal device transmits the first message, the first message carries the ID information of the first remote terminal.

Figure 11:
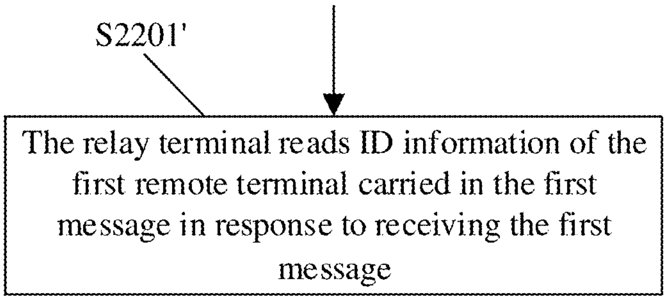
FIG. 11 exemplarily illustrates a schematic flowchart of a transmission method according to another embodiment of the present disclosure.

Optionally, as illustrated in FIG. 11, the transmission method according to the embodiment may further include S2201'. At S2201', in response to receiving the first message, the relay terminal reads and stores the ID information of the first remote terminal carried in the first message.

Optionally, the transmission method according to the embodiment may further include that: the relay terminal receives a second message from the second remote terminal, the second message carrying ID information of the second remote terminal.

Different from the previous embodiments, in the embodiment, each of corresponding messages carries ID information of a respective remote terminal, so that the message is convenient to correspond to a remote terminal.

Figure 12:
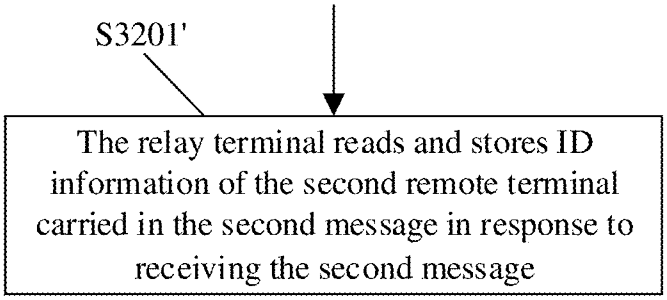
FIG. 12 exemplarily illustrates a schematic flowchart of a transmission method according to another embodiment of the present disclosure.

Optionally, as illustrated in FIG. 12, the transmission method according to the embodiment may further include S3201'. At S3201', in response to receiving the second message, the relay terminal reads and stores the ID information of the second remote terminal carried in the second message.

Optionally, the transmission method according to the embodiment may further include that: the relay terminal transmits the second message to the network device.

Optionally, the transmission method according to the embodiment may further include that: the relay terminal receives a response message for responding to at least one of the first message or the second message from the network device.

Optionally, the response message indicates at least one of the first user identity of the first remote terminal corresponding to the ID information of the first remote terminal, or a second user identity of the second remote terminal corresponding to the ID information of the second remote terminal.

Optionally, the transmission method according to the embodiment may further include that: the relay terminal receives a third message as the response message from the network device, the third message being based on the first user identity of the first remote terminal.

Optionally, the transmission method according to the embodiment may further include that: the relay terminal forwards the third message received from the network device to the first remote terminal; or the relay terminal transmits a fourth message to the first remote terminal, the fourth message being based on the first user identity of the first remote terminal parsed out from the third message.

In the embodiment of the present disclosure, by enabling the ID information of a remote terminal to be carried in the corresponding message sent by the remote terminal, the relay terminal and the network device may conveniently identify the remote terminal corresponding to the message.

Figure 13:
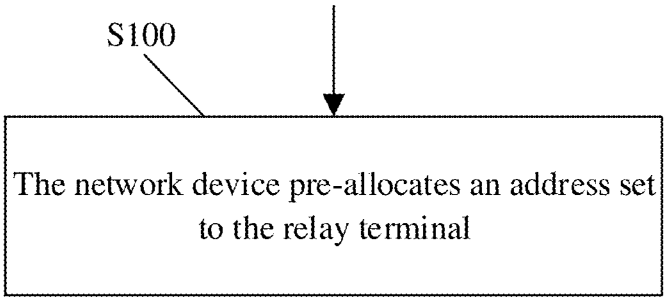
FIG. 13 exemplarily illustrates a schematic flowchart of a transmission method according to another embodiment of the present disclosure.

Optionally, as illustrated in FIG. 13, the transmission method according to the embodiment may further include the following operation.

At S100, the network device pre-allocates an address set to the relay terminal.

Figure 14:
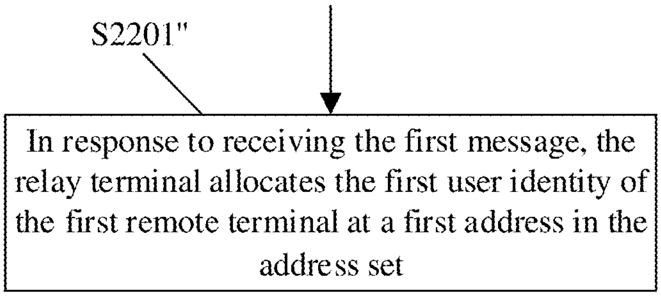
FIG. 14 exemplarily illustrates a schematic flowchart of a transmission method according to another embodiment of the present disclosure.

Optionally, as illustrated in FIG. 14, the transmission method according to the embodiment may further include the following operation.

At S2201", in response to receiving the first message, the relay terminal allocates the first user identity of the first remote terminal at a first address in the address set.

The first message carries the first user identity when the relay terminal transmits the first message to the network device.

Optionally, the transmission method according to the embodiment may further include that: the relay terminal receives a second message from a second remote terminal. The operation is similar to the corresponding operation described previously.

Figure 15:
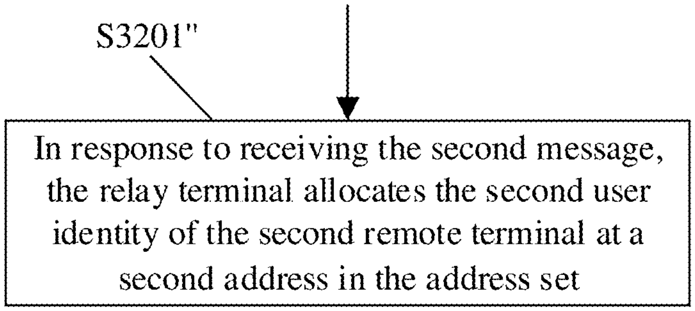
FIG. 15 exemplarily illustrates a schematic flowchart of a transmission method according to another embodiment of the present disclosure.

Optionally, as illustrated in FIG. 15, the transmission method according to the embodiment may further include the following operation.

At S3201", in response to receiving the second message, the relay terminal allocates the second user identity of the second remote terminal at a second address in the address set.

Optionally, the transmission method according to the embodiment may further include that: the relay terminal transmits the second message to the network device. The second message carries the second user identity when the relay terminal transmits the second message to the network device.

Optionally, at least one of the first user identity or the second user identity is placed in a respective adaptation layer header.

Subsequent operations of the embodiment are similar to the corresponding operations described previously and will not be repeated here.

Figure 16:
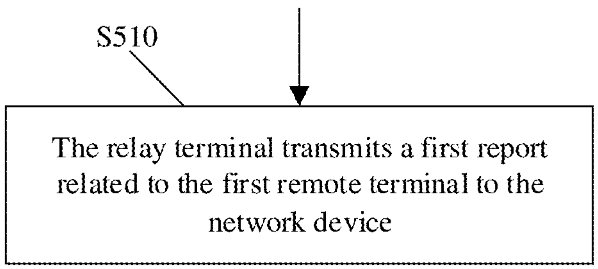
FIG. 16 exemplarily illustrates a schematic flowchart of a transmission method according to another embodiment of the present disclosure.

Optionally, as illustrated in FIG. 16, the transmission method according to an embodiment may further include the following operation.

At S510, the relay terminal transmits a first report related to the first remote terminal to the network device.

Optionally, the first report may include at least one of:

ID information of the first remote terminal; and the first remote terminal needing to establish a layer 2 relay connection.

Optionally, it may be indicated that the first remote terminal needs to establish a layer 2 relay connection by, for example, a connection establishment request or the like.

Figure 17:
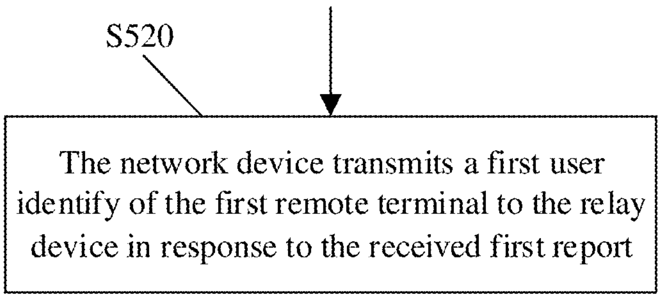
FIG. 17 exemplarily illustrates a schematic flowchart of a transmission method according to another embodiment of the present disclosure.

Optionally, as illustrated in FIG. 17, the transmission method according to an embodiment may further include the following operation.

At S520, in response to the received first report, the network device transmits a first user identify of the first remote terminal to the relay device.

After receiving the first report, the network device configures a corresponding first user identify for the first remote terminal and transmits the first user identify to the relay device.

Figure 18:
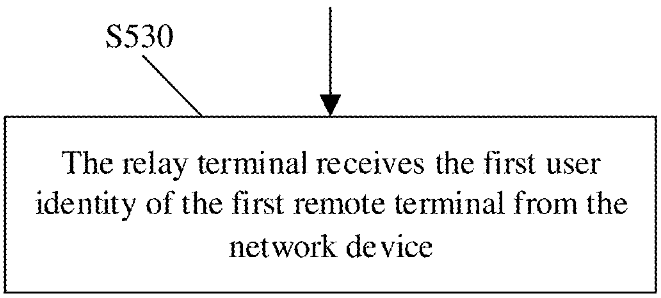
FIG. 18 exemplarily illustrates a schematic flowchart of a transmission method according to another embodiment of the present disclosure.

Optionally, as illustrated in FIG. 18, the transmission method according to an embodiment may further include the following operation.

At S530, the relay terminal receives the first user identity of the first remote terminal from the network device.

Here, at least one of the above-mentioned operations S510-S530 may be operated before or after the above-mentioned operations S210 and/or S220. That is, the relay terminal may transmit the first report and/or the network device may transmit the first user identity in response to the first report before or after the first remote terminal transmits the first message to the relay terminal.

Optionally, the relay terminal may transmit a second report related to a second remote terminal to the network device.

Optionally, the second report may include at least one of:

ID information of the second remote terminal; and the second remote terminal needing to establish a layer 2 relay connection.

Optionally, the relay terminal may receive the second user identity of the second remote terminal from the network device.

Similarly, the relay terminal may transmit the second report and/or the network device may transmit the second user identity in response to the second report before or after the second remote terminal transmits the second message to the relay terminal.

In addition, similarly, regardless of whether the above-mentioned operations related to the first report/second report are performed before or after the first/second remote terminal transmits the first/second message, in the embodiment, after receiving a corresponding message (e.g. the first message/the second message) from the remote terminal, the relay terminal may transmit the received corresponding message to the network device as in the aforementioned operation S220.

For example, when transmitting the second message received from the second remote terminal to the network device, the relay terminal may carry an adaptation layer message header in the second message, and the adaptation layer message header may contain a second user identity allocated by the network device to the second remote terminal.

Subsequent operations of the embodiment may be similar to the corresponding operations described previously and will not be repeated here.

As can be seen from the various embodiments given above, the present disclosure supports obtaining user identify information required by the adaptation layer in various manners. Therefore, the present disclosure should not be limited to the exemplary manners given above.

Figure 19:
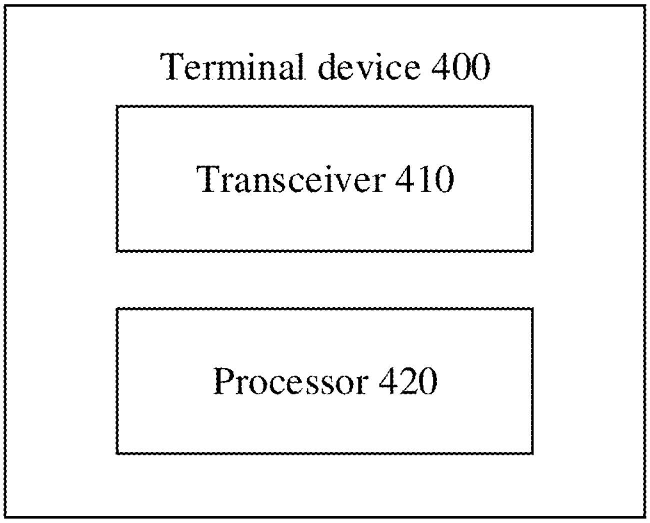
FIG. 19 exemplarily illustrates a structural diagram of a terminal device according to an embodiment of the present disclosure.

FIG. 19 illustrates a schematic block diagram of a terminal device according to an embodiment of the present disclosure. The terminal device may be used as a relay terminal.

As illustrated in FIG. 19, the terminal device 400 according to the embodiment of the present disclosure may include for example a transceiver 410 and a processor 420.

In addition, the terminal device may further include a memory and the like.

The transceiver 410 may be configured to receive a first message from a first remote terminal and transmit the received first message to a network device.

The processor 420 may be configured to determine a first user identity of the first remote terminal corresponding to the first message.

Optionally, the transceiver 410 may further be configured to perform the receiving and transmitting operations performed by the relay terminal in the transmission method described above, but is not limited thereto.

Optionally, the processor 420 may further be configured to perform processing operations, such as determining, obtaining, reading, saving and the like performed by the relay terminal in the transmission method described above, but not limited thereto.

For the sake of brevity, the details of its operations will not be repeated here.

Figure 20:
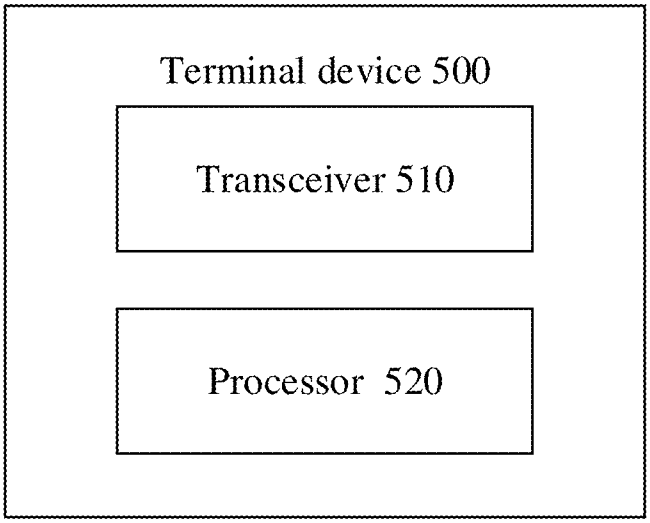
FIG. 20 exemplarily illustrates a structural diagram of a terminal device according to an embodiment of the present disclosure.

FIG. 20 illustrates a schematic block diagram of a terminal device according to an embodiment of the present disclosure. The terminal device may be used as a remote terminal.

As illustrated in FIG. 20, the terminal device 500 according to the embodiment of the present disclosure may include for example a transceiver 510.

In addition, the terminal device may further include a memory and the like.

The transceiver 510 may be configured to transmit a first message to a relay terminal as a terminal device, such that the relay terminal transmits the first message to a network device and determines a first user identity of the remote terminal as a first remote terminal corresponding to the first message.

Optionally, the transceiver 510 may further be configured to perform the receiving and transmitting operations performed by the remote terminal in the transmission method described above, but is not limited thereto.

Optionally, the terminal device 500 according to the embodiment of the present disclosure may include for example a processor 520.

Optionally, the processor 520 may be configured to perform the processing operations, such as determining, obtaining, reading, saving and the like performed by the remote terminal in the transmission method described above, but not limited thereto.

For the sake of brevity, the details of its operations will not be repeated here.

Figure 21:
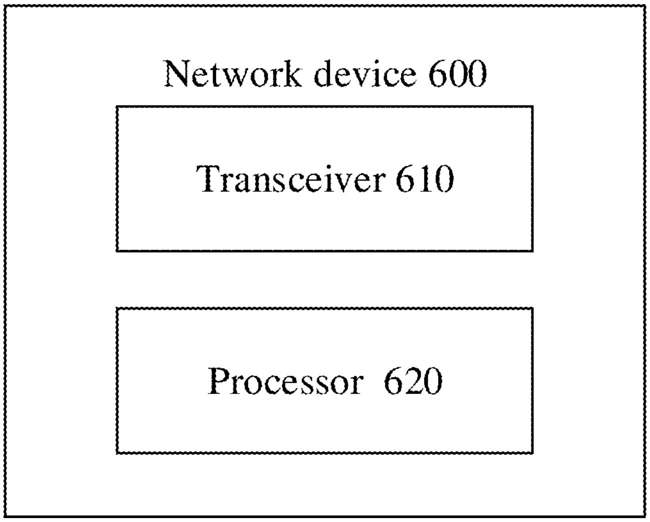
FIG. 21 exemplarily illustrates a structural diagram of a network device according to an embodiment of the present disclosure.

FIG. 21 illustrates a schematic block diagram of a network device according to an embodiment of the present disclosure.

As illustrated in FIG. 21, the network device 600 according to the embodiment of the present disclosure may include for example a transceiver 610.

In addition, the network device may further include a memory and the like.

The transceiver 610 is configured to receive a first message from a relay terminal as a terminal device, the first message being transmitted to the relay terminal by a first remote terminal.

Optionally, the transceiver 610 may further be configured to perform the receiving and transmitting operations performed by the remote terminal in the transmission method described above, but is not limited thereto.

Optionally, the network device 600 according to the embodiments of the present disclosure may include for example a processor 620.

Optionally, the processor 620 may be configured to perform processing operations, such as determining, obtaining, reading, saving and the like performed by the network device in the transmission method described above but not limited thereto.

For the sake of brevity, the details of its operations will not be repeated here.

Figure 22:
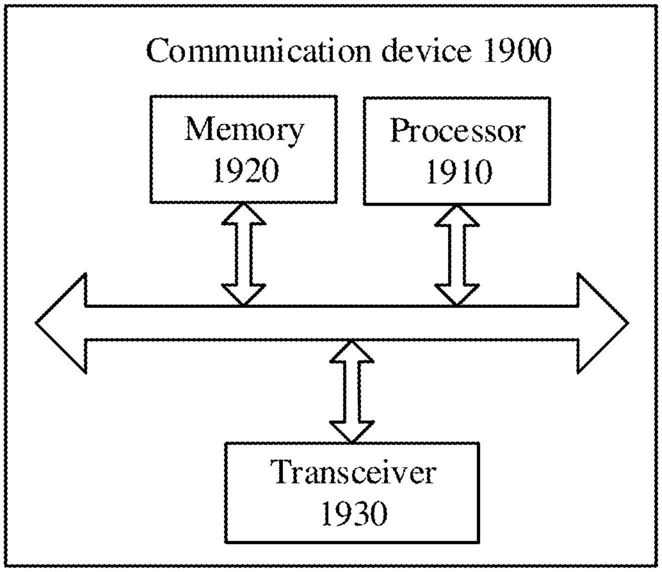
FIG. 22 exemplarily illustrates a structural diagram of a communication device according to an embodiment of the present disclosure.

FIG. 22 is a schematic structural diagram of a communication device 1900 according to an embodiment of the present disclosure. The communication device 1900 illustrated in FIG. 22 includes a processor 1910 that can call and execute a computer program from a memory to implement the method in the embodiments of the present disclosure.

Optionally, as illustrated in FIG. 22, the communication device 1900 may further include a memory 1920. The processor 1910 may call and execute a computer program from the memory 1820 to implement the method in the embodiments of the present disclosure.

The memory 1920 may be a separate device independent of the processor 1910 or may be integrated in the processor 1910.

Optionally, as illustrated in FIG. 22, the communication device 1900 may further include a transceiver 1930. The processor 1910 may control the transceiver 1930 to communicate with other devices, and in particular send information or data to other devices, or receive information or data sent by other devices.

The transceiver 1930 may include a transmitter and a receiver. The transceiver 1930 may further include antennas. The number of antennas may be one or more.

Optionally, the communication device 1900 may be a terminal device of the embodiments of the present disclosure, and the communication device 1900 may implement corresponding processes implemented by the terminal device in the respective methods of the embodiments of the present disclosure, which will not be repeated here for the sake of brevity.

Optionally, the communication device 1900 may be a network device of the embodiments of the present disclosure, and the communication device 1900 may implement corresponding processes implemented by the network device in the respective methods of the embodiments of the present disclosure, which will not be repeated here for the sake of brevity.

Figure 23:
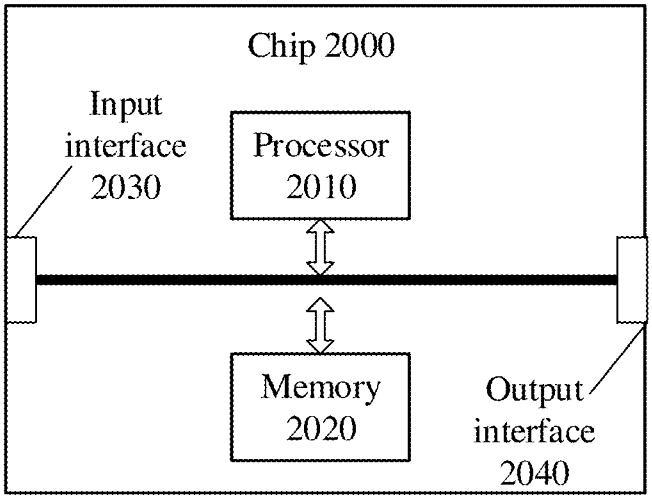
FIG. 23 exemplarily illustrates a structural diagram of a chip according to an embodiment of the present disclosure.

FIG. 23 is a schematic structural diagram of a chip 2000 according to an embodiment of the present disclosure. As illustrated in FIG. 20, the chip 2000 includes a processor 2010 that may call and execute a computer program from memory to implement the method in the embodiments of the present disclosure.

Optionally, as illustrated in FIG. 23, the chip 2000 may further include a memory 2020. The processor 2010 may call and execute a computer program from the memory 2020 to implement the method in the embodiments of the present disclosure.

The memory 2020 may be a separate device independent of the processor 2010 or may be integrated in the processor 2010.

Optionally, the chip 2000 may also include an input interface 2030. The processor 2010 may control the input interface 2030 to communicate with other devices or chips, and in particular obtain information or data sent by other devices or chips.

Optionally, the chip 2000 may also include an output interface 2040. The processor 2010 may control the output interface 2040 to communicate with other devices or chips, and in particular output information or data to other devices or chips.

Optionally, the chip may applied to be a terminal device of the embodiments of the present disclosure, and the chip may implement corresponding processes implemented by the terminal device in various methods of the embodiments of the present disclosure, which will not be repeated here for the sake of brevity.

Optionally, the chip may applied to be a network device of the embodiments of the present disclosure, and the chip may implement corresponding processes implemented by the network device in various methods of the embodiments of the present disclosure, which will not be repeated here for the sake of brevity.

It should be understood that the chip referred to in the embodiments of the present disclosure may also be referred to as a system-level chip, a system chip, a chip system or a system-on-chip or the like.

Figure 24:
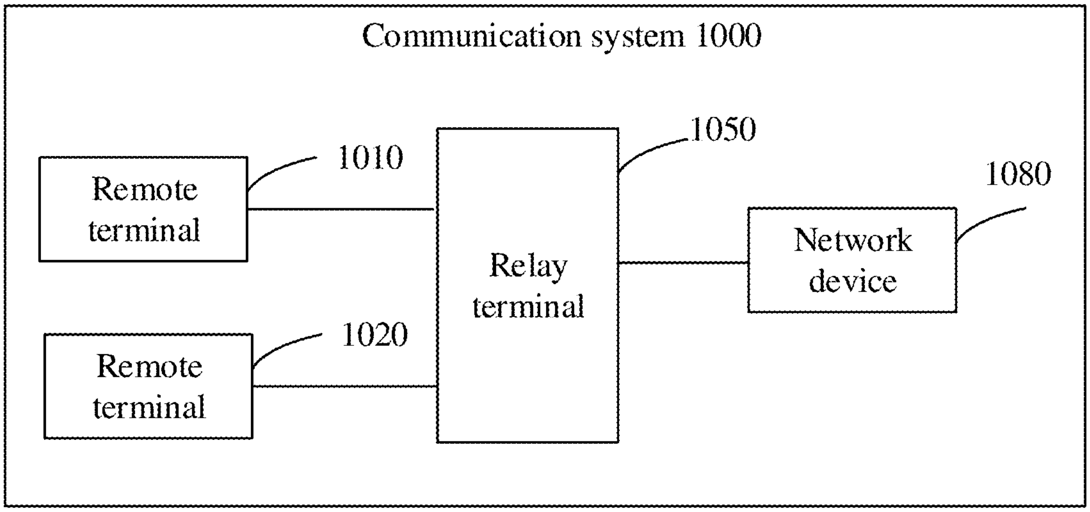
FIG. 24 exemplarily illustrates a structural diagram of a communication system according to an embodiment of the present disclosure.

FIG. 24 is a schematic block diagram of a communication system 1000 according to an embodiment of the present disclosure. As illustrated in FIG. 24, the communication system 1000 may include a terminal device 1010 and a terminal device 1020 as the remote terminals, a terminal device 1050 as the relay terminal, and a network device 1080 and the like.

The above-mentioned terminal devices 1010 and 1020 may be configured to implement corresponding functions implemented by the terminal device as a remote terminal in the above-mentioned transmission method, or may be the above-mentioned terminal device 400 as a remote terminal or the communication device 1900 as a terminal device. The above-mentioned terminal device 1050 may be configured to implement corresponding functions implemented by the terminal device as a relay terminal in the above-mentioned transmission method, or may be the above-mentioned terminal device 500 as a relay terminal or the communication device 1900 as a relay device. The network 1080 may be configured to implement the corresponding functions implemented by the network device in the transmission method described above or may be the network device 600 described above or the communication device 1900 as a network device. For brevity, details are not repeated here.

The processor mentioned above may be a general purpose processor, a digital signal processor (DSP), a field programmable gate array (FPGA), an application specific integrated circuit (ASIC), or other programmable logic devices, transistor logic devices, discrete hardware components, and the like. The general purpose processor mentioned above may be a microprocessor or any conventional processor or the like.

The memory mentioned above may be a volatile memory or a non-volatile memory or may include both a volatile memory and a non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM).

It should be understood that the memory described above is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM), etc. That is, the memory in the embodiments of the present disclosure is intended to include, but is not limited to, these memories and any other suitable types of memory.

In the above-described embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the flow or function described in accordance with embodiments of the present disclosure is generated in whole or in part. The computer may be a general purpose computer, a special purpose computer, a computer network, or other programmable device. The computer instructions may be stored in a computer-readable storage medium, or from one computer-readable storage medium to another. For example, the computer instructions may be transmitted from a web site, a computer, a server, or data center to another web site, computer, server, or data center via wired (e.g. coaxial cable, optical fiber, digital subscriber line (DSL)) or wireless (e.g. infrared, wireless, microwave, etc.). The computer-readable storage medium may be any usable medium accessible to a computer or a data storage device containing one or more usable media integration, such as a server, data center, etc. The usable media may be magnetic media (e.g. floppy disk, hard disk, magnetic tape), optical media (e.g. DVD), or semiconductor media (e.g. solid state disk (SSD)), etc.

It should be understood that in various embodiments of the present disclosure, the size of the sequence number of the above-mentioned processes does not mean the order of execution, and the execution order of each process should be determined by its function and inherent logic, and should not be limited in any way to the implementation process of the embodiments of the present disclosure. Those skilled in the art will clearly appreciate that, for convenience and conciseness of description, the specific operating processes of the above-described systems, apparatuses and units may refer to the corresponding processes in the aforementioned method embodiments and will not be repeated herein.

The above is only the specific implementation of the present disclosure, but the scope of protection of the present disclosure is not limited thereto. Any person skilled in the art can easily think of changes or substitutions within the technical scope disclosed in the present disclosure, which should be covered within the protection scope of the present disclosure. Therefore, the scope of protection of the present disclosure shall be subject to the scope of protection of the claim.

The invention claimed is:

1. A transmission method, comprising:

receiving, by a relay terminal as a terminal device, a first message from a first remote terminal and transmitting the first message to a network device; and determining, by the relay terminal, a first user identity of the first remote terminal corresponding to the first message, wherein the first message does not include the first user identity and does not carry an adaptation layer header, when the first remote terminal transmits the first message to the relay terminal, the method further comprising:

transmitting, by the relay terminal, a first report related to the first remote terminal to the network device; and receiving, by the relay terminal, the first user identity of the first remote terminal from the network device, wherein the adaptation layer header is carried in the first message when the relay terminal transmits the first message to the network device, and the adaptation layer header contains the first user identity of the first remote terminal received from the network device.

2. The method of claim 1, further comprising:

receiving, by the relay terminal, a second message from a second remote terminal.

3. The method of claim 2, further comprising:

transmitting, by the relay terminal, the second message to the network device.

4. The method of claim 1, further comprising:

transmitting, by the relay terminal, a second report related to a second remote terminal to the network device.

5. The method of claim 4, further comprising:

receiving, by the relay terminal, a second user identity of the second remote terminal from the network device.

6. The method of claim 5, wherein an adaptation layer header is carried in a second message when the second message is transmitted by the relay terminal to the network device, the adaptation layer header containing the second user identity of the second remote terminal received from the network device.

7. The method of claim 4, wherein the second report comprises: ID information of the second remote terminal.

8. The method of claim 1, wherein the first report comprises: ID information of the first remote terminal.

9. The method of claim 1, wherein the first user identity is obtained by the first remote terminal through a signaling from a network.

10. The method of claim 1, wherein an adaptation layer header is not carried in at least one of the first message or a second message when transmitted by the relay terminal to the network device.

11. A terminal device, as a relay terminal, the terminal device comprising:

a transceiver, configured to receive a first message from a first remote terminal and transmit the first message to a network device; and a processor, configured to determine a first user identity of the first remote terminal corresponding to the first message, wherein the first message does not include the first user identity and does not carry an adaptation layer header, when the first remote terminal transmits the first message to the relay terminal, wherein the transceiver is further configured to:

transmit a first report related to the first remote terminal to the network device; and receive the first user identity of the first remote terminal from the network device, wherein the adaptation layer header is carried in the first message when the relay terminal transmits the first message to the network device, and the adaptation layer header contains the first user identity of the first remote terminal received from the network device.

12. The terminal device of claim 11, wherein the transceiver is configured to receive a second message from a second remote terminal.

13. The terminal device of claim 12, wherein the transceiver is configured to transmit the second message to the network device.

14. The terminal device of claim 11, wherein the transceiver is configured to transmit a second report related to a second remote terminal to the network device.

15. The terminal device of claim 11, wherein the transceiver is configured to:

receive a second user identity of the second remote terminal from the network device.

16. The terminal device of claim 15, wherein an adaptation layer header is carried in a second message when the second message is transmitted by the relay terminal to the network device, the adaptation layer header containing the second user identity of the second remote terminal received from the network device.

17. A network device, comprising:

a transceiver, configured to receive a first message from a relay terminal as a terminal device, wherein the first message is transmitted to the relay terminal by a first remote terminal, wherein a first user identity of the first remote terminal corresponding to the first message is determined by the relay terminal, wherein the first message does not include the first user identity and does not carry an adaptation layer header, when the first remote terminal transmits the first message to the relay terminal, wherein the transceiver is further configured to:

receive a first report related to the first remote terminal from the relay terminal, and transmit the first user identity of the first remote terminal to the relay terminal, wherein an adaptation layer header is carried in the first message when the relay terminal transmits the first message to the network device, and the adaptation layer header contains the first user identity of the first remote terminal received from the transceiver of the network device.

18. The network device of claim 17, wherein the transceiver is further configured to:

receive a second message from the relay terminal.

19. The network device of claim 18, wherein the transceiver is further configured to:

transmit a second user identity of the second remote terminal to the relay terminal.

20. The network device of claim 19, wherein an adaptation layer header is carried in a second message when the second message is transmitted by the relay terminal to the network device, the adaptation layer header containing the second user identity of the second remote terminal received from the network device.

* * * * *